4 Sheets
Sheet 1

C. Wheeler Jr.
Mower.

No. 877

Reissued Jan. 3, 1860

Witnesses
Thos. A. Lefferman
E. Corson

Cyrenus Wheeler Jr

4 Sheets
Sheet 2

C. Wheeler Jr.

Mower

№ 877

Reissued Jan. 3, 1860

Witnesses
Thos. H. Ufferman
E. Cohen

Cyrenus Wheeler Jr.

4 Sheets
Sheet 3

C. Wheeler Jr.

Mower.

No. 877 Reissued Jan. 3, 1860

Witnesses
Thos. B. Jeffersman
E. Cohen

Lyserenus Wheeler Jr.

4 Sheets
Sheet 4

C. Wheeler Jr.

Mower.

No 877 Reissued Jan. 3, 1860

Witnesses
Thos. R. Offerman
E. Cohen

Cyrenus Wheeler Jr

UNITED STATES PATENT OFFICE.

CYRENUS WHEELER, JR., OF POPLAR RIDGE, NEW YORK.

IMPROVEMENT IN GRAIN AND GRASS HARVESTERS.

Specification forming part of Letters Patent No. 12,044, dated December 5, 1854; Reissue No. 877, dated January 3, 1860.

DIVISION C.

*To all whom it may concern:*

Be it known that I, CYRENUS WHEELER, Jr., of Poplar Ridge, in the county of Cayuga and State of New York, have invented certain new and useful Improvements in Grain and Grass Harvesters; and I do hereby declare the following to be a full, clear, and exact description of the same, reference being had to the accompanying drawings, making a part of this specification, in which—

Figure 1:
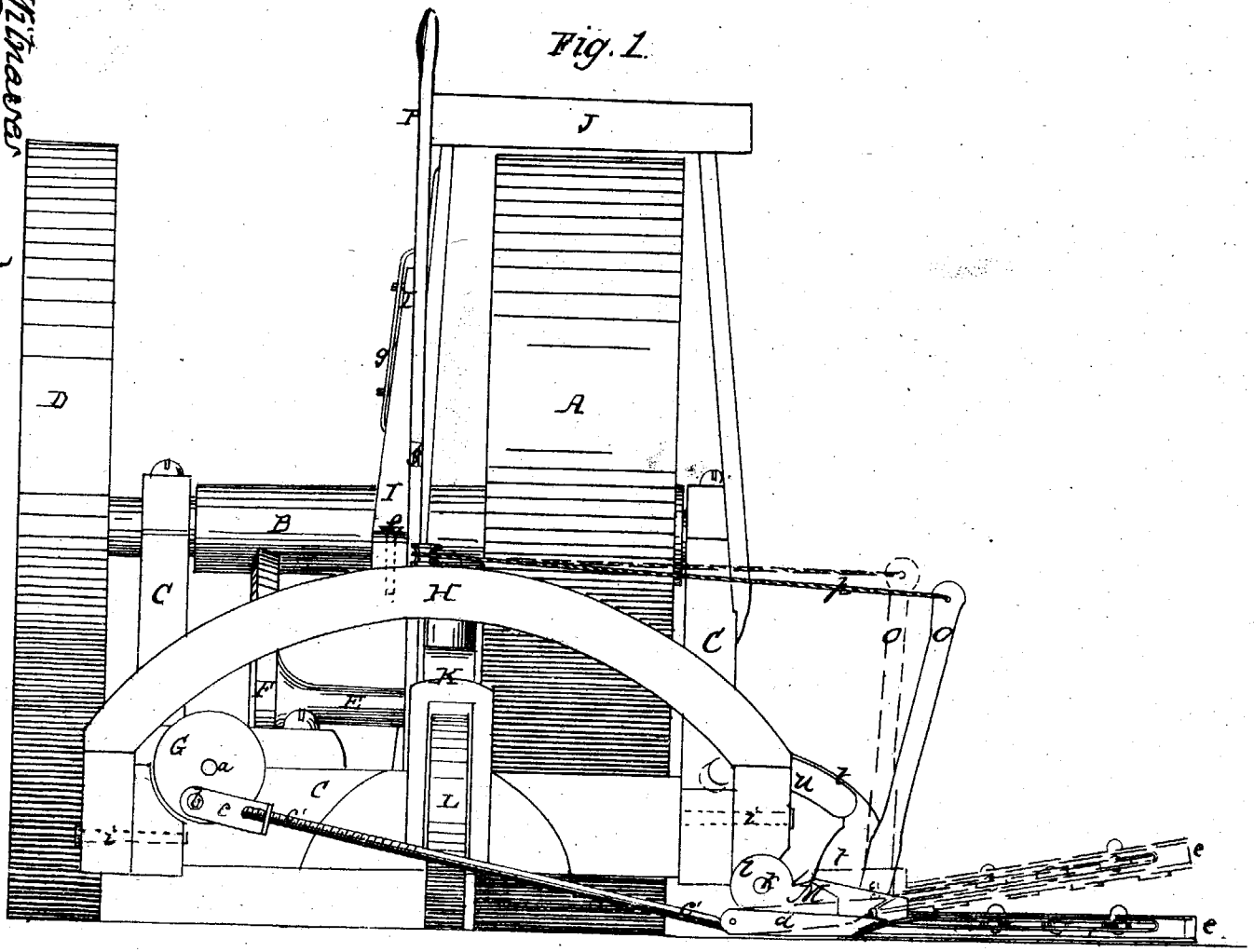
Figure 2:
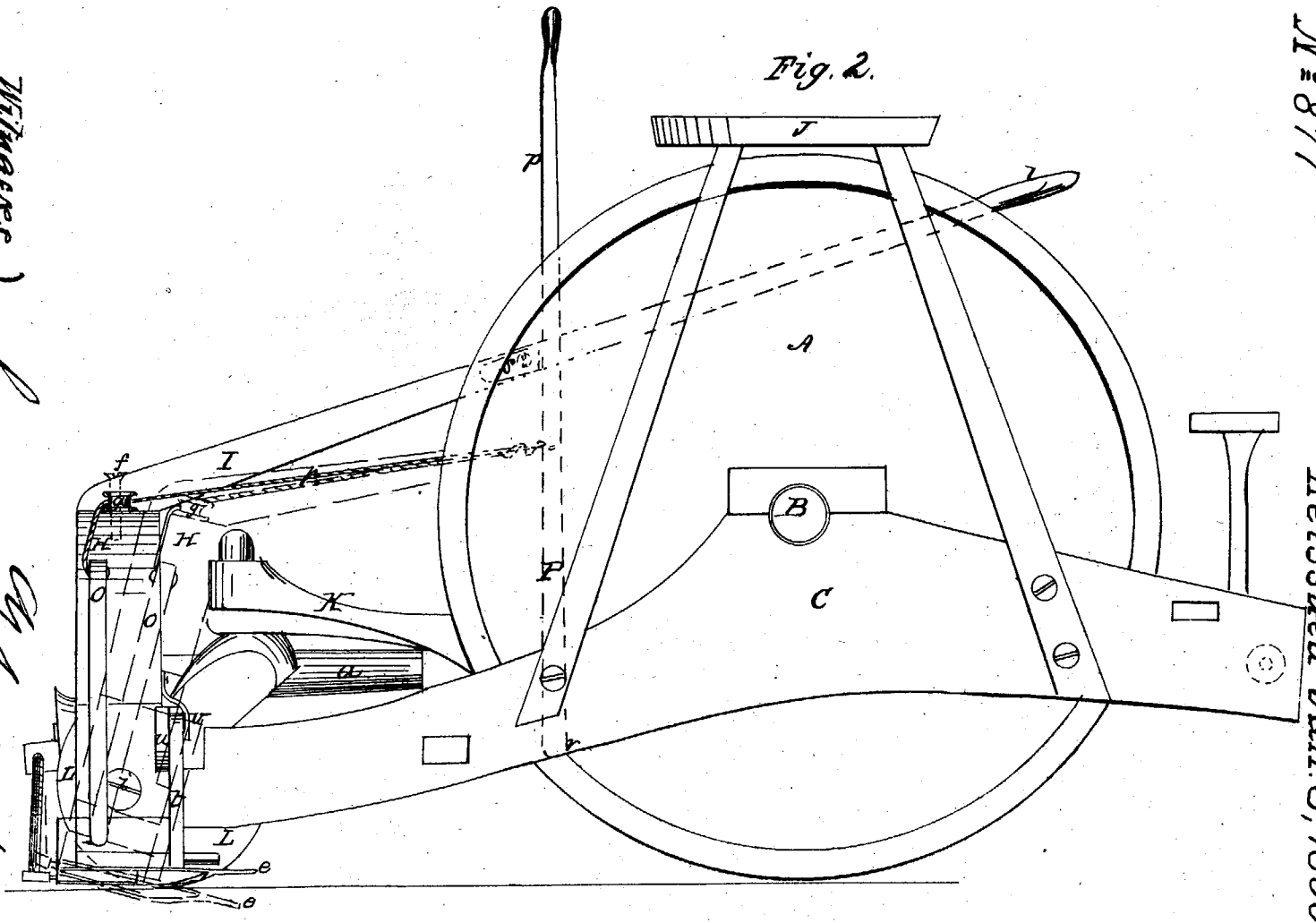
Figure 3:
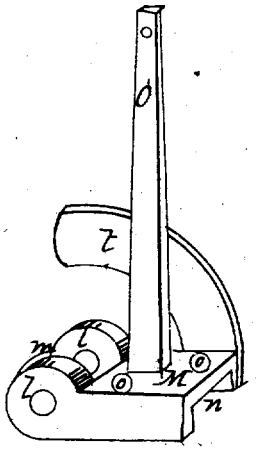
Figure 4:
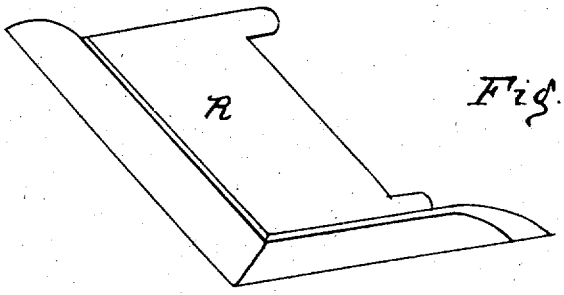
Figure 6:
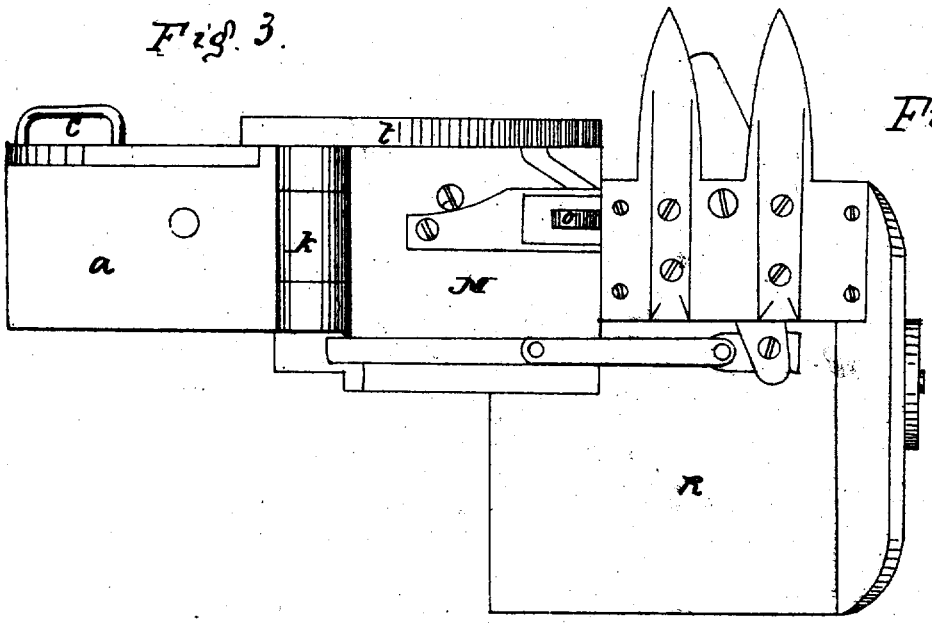
Figure 7:
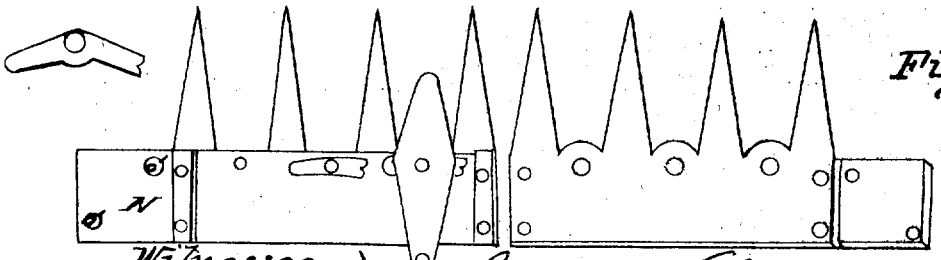
Figure 5:
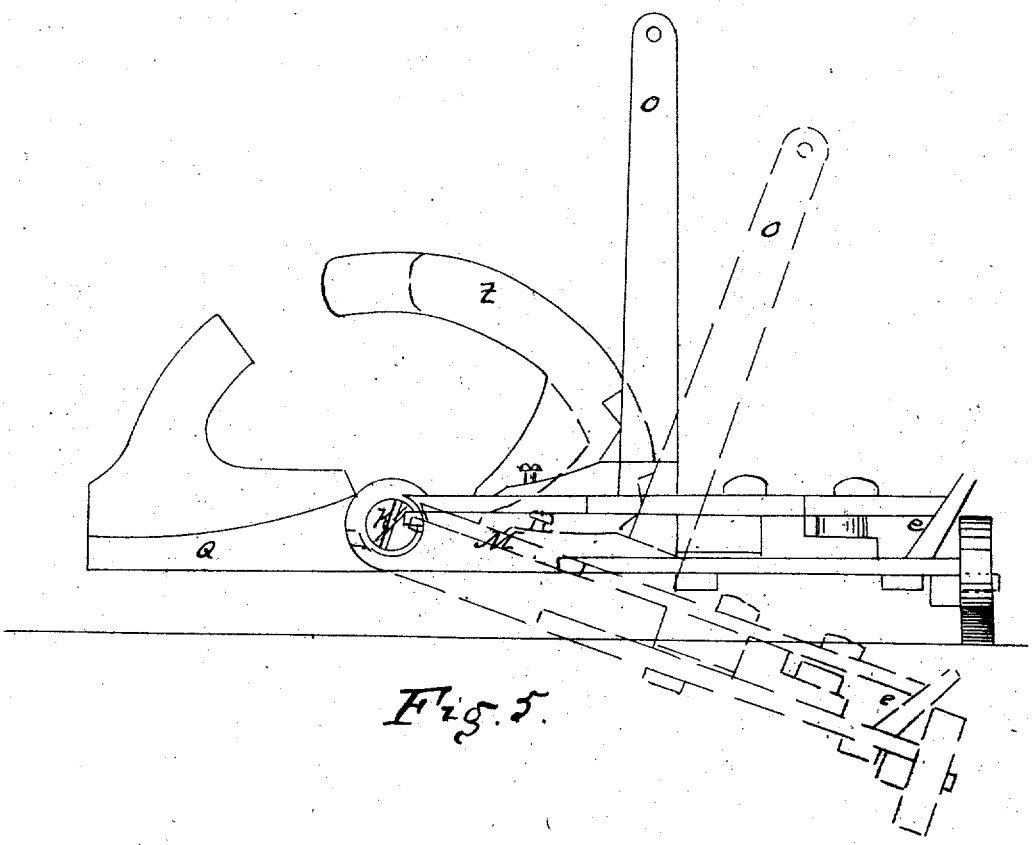

Figure 1 represents a rear elevation of the machine. Fig. 2 represents an elevation thereof from that side of the machine next the standing grain or grass. Figs. 3 and 4 represent detached portions thereof. Figs. 5 and 6 represent, on an enlarged scale, a rear elevation and plan, respectively, of the finger-bar and its hinged shoe or support. Fig. 7 represents a cutting apparatus.

Similar letters of reference, where they occur in the several drawings, denote like parts of the machine in all of them.

In a grain and grass harvester it is important that the finger-bar should be so connected to the main frame as that the points of the fingers may be elevated or depressed to suit the conditions of the ground or the material to be cut.

To effect this purpose is the object of this part of my invention; and it consists in so hinging a finger-bar by one of its ends to the main frame as that it may oscillate or turn around its longitudinal axis to raise or lower the points of the fingers and make them conform to the character of the ground or the crop that is to be cut; and it further consists in combining with a finger-bar so hung and having such an oscillating motion a pitman or connecting-rod in two pieces, one of which can move independently of the other, so as prevent cramping or torsion of the said connecting-rod.

To enable others skilled in the art to make and use my invention, I will proceed to describe the same with reference to the drawings.

A represents a main supporting and driving wheel, fast on the axle B; and D is an auxiliary supporting-wheel, which is loose on said axle.

C is the main frame, and at that end of said main frame which is to carry the finger-bar is pivoted an arm, brace, or support, H, so that it may vibrate on said pivoted point. To this arm, brace, or support is connected a shoe-piece, M, as shown in the drawings, and to this shoe-piece is bolted the finger-bar. By moving the piece H as shown by red lines in Fig. 2 the points of the fingers will be thrown down toward the ground, the heel of the finger-bar being correspondingly raised up, and by moving said piece H and inclining it in the opposite direction the points of the fingers will be raised up and the heel of the finger-bar depressed, and thus any elevation or depression of the points of the fingers may be had within the range of the motion of the piece H around its hinged connection to the main frame.

It is obvious that where a finger-bar thus moved is used some compensation for its change in position must be provided for, else the connecting-rod that drives the cutters will bind or twist under this turning of the finger-bar. To prevent this, I make the connecting-rod or pitman in two pieces, *c c'*, one united to the other by a screw-thread, so that as the finger-bar is oscillated it will simply turn one piece, *c'*, in the other, *c*, and thus all cramping or torsion of the pitman is avoided. This turning of one part of the pitman upon the other of course shortens or lengthens the pitman; but it is so slight, scarcely ever exceeding a quarter-turn when the machine is in operation, that it amounts to nothing injurious in that particular.

Having thus fully described the nature and object of this invention, what I claim in this patent is—

1. So hinging a finger-bar by one of its ends only to the main frame as that it may oscillate or turn around its longitudinal axis for the purpose of raising or lowering the points of the fingers to adapt the machine to the condition of the ground or of the crop to be cut, substantially as described.

2. In combination with a finger-bar hinged by one of its ends only to the main frame so that the points of its fingers can be raised or depressed, a connecting-rod or pitman in two pieces, and so connected that one piece can turn independently of the other for the purpose of preventing the cramping or torsion of said rod when the finger-bar is turned, substantially as described.

CYRENUS WHEELER, JR.

Witnesses:
THOS. H. UPPERMAN,
E. COHEN.